United States Patent

[11] 3,599,875

| [72] | Inventors | Thomas A. Wynosky<br>Hazardville;<br>Walter L. Blackmore, Wethersfield, both of, Conn. |
|---|---|---|
| [21] | Appl. No. | 797,807 |
| [22] | Filed | Feb. 10, 1969 |
| [45] | Patented | Aug. 17, 1971 |
| [73] | Assignee | United Aircraft Corporation<br>East Hartford, Conn. |

[54] TRANSLATING AIR SCOOP EJECTOR NOZZLE
10 Claims, 3 Drawing Figs.
[52] U.S. Cl. .................................................. 239/265.41,
239/265.37
[51] Int. Cl. ................................................... B64c 15/06
[50] Field of Search ......................................... 239/265.37,
265.41, 265.43, 265.39

[56] References Cited
UNITED STATES PATENTS

| 3,048,973 | 8/1962 | Benedict | 239/265.39 |
| 3,386,658 | 6/1968 | Mehr | 239/265.41 X |
| 3,390,837 | 7/1968 | Freeman | 239/265.41 X |
| 3,432,100 | 3/1969 | Hardy et al. | 239/265.37 X |
| 3,448,583 | 6/1969 | Maguire | 239/265.37 X |

Primary Examiner—Lloyd L. King
Attorney—James A. Kane

ABSTRACT: An exhaust nozzle of the ejector type which operates over the entire flight regime of a gas turbine powered aircraft to provide optimum performance at each and every point over the flight regime. The exhaust nozzle construction is also capable of function as a thrust reverser while providing improved noise suppression characteristics.

PATENTED AUG 17 1971

3,599,875

INVENTORS
THOMAS A. WYNOSKY
WALTER L. BLACKMORE

BY James Q. Kane

AGENT

TRANSLATING AIR SCOOP EJECTOR NOZZLE

This application is reported as a subject invention under Government contract AF33(657)3128.

BACKGROUND OF THE INVENTION

This invention relates to an exhaust nozzle for a gas turbine engine and more particularly to exhaust nozzles of the ejector type used in multimission aircraft, the invention employing a translatable air scoop which provides optimum performance over all flight regimes in an aircraft powered by the gas turbine engine.

The use of ejector-type exhaust nozzles on gas turbine engines is well known in the prior art; however, a basic problem with the use of any nozzle for multimission aircraft, including ejector nozzles, is to find a configuration or construction which will provide the optimum performance at each individual operating point over the entire flight regime of the aircraft, or more specifically, the operating range of the gas turbine engine which powers the aircraft. The typical or normal solution to this problem, as described in the prior art constructions, is to either provide an optimum performance at a critical flight condition, such as the transonic region, or provide the optimum operating conditions at the primary vehicle cruise point or to find the configuration that best comprises these operating regimes. These prior art constructions, in other words, have not been able to provide an optimum performance condition for each and every point over the entire flight regime of the aircraft. The present invention or construction solves this problem by utilizing an air scoop or shroud such that the shroud and inlet ram drag losses when compared to the internal over expansion losses within the engine are optimized at each and every point.

SUMMARY OF THE INVENTION

The primary object of the present invention is to provide an ejector nozzle system which is compatible for use with a gas turbine engine powered aircraft over the entire flight regime of the aircraft while providing optimum performance at each and every point over this flight regime. An added benefit achieved by the invention is that the optimum performance of the configuration can be attained even when the nozzle is operating within the influence of an adverse installation location.

The present invention is particularly suited for any type gas turbine engine whether it be a straight jet, turbofan, or a gas turbine engine which utilizes a plurality of streams exhausting from the engine. To achieve the aforementioned objectives the present invention utilizes an air scoop, positioned at the downstream side of the engine housing, which is both rotatable and translatable upstream and downstream. The air scoop by being both translatable upstream and downstream and simultaneously rotatable provides a construction whereby the inlet area of the air scoop and the exit area of the air scoop can be matched to provide optimum performance for each given flight condition. More specifically, for example, at low speeds the inlet ram and air scoop drag are usually small; however, internal overexpansion losses are usually severe. Therefore, at these low speeds, the air scoop ejector would be translated rearward and oriented to a position where the exit area would be decreased and the inlet area would be increased, the decreasing of the exit area decreasing internal overexpansion losses. Increasing the inlet area simultaneously allows large amounts of air to be collected through the inlet area thereby lowering overexpansion and providing thrust augmentation with only a slight increase of external drag. As flight speed is increased, the external drags become more pronounced and the internal losses are reduced. Therefore, the air scoop would be translated upstream and oriented at a new optimum position, this translation and orientation of the scoop increases the exit area of the scoop and decreases the inlet area of the scoop, hence once again providing an optimum trade off between internal expansion and external drag.

It should be clear from the foregoing and that by controlling the inlet and exit areas of the scoop, the present invention affects a compromise or balance between the scoop drag losses and the inlet ram drag losses as opposed to the internal overexpansion losses. By controlling this compromise, it is possible to provide an optimized performance at each and every flight condition.

DESCRIPTION OF THE PREFERRED EMBODIMENT

Figure 3:
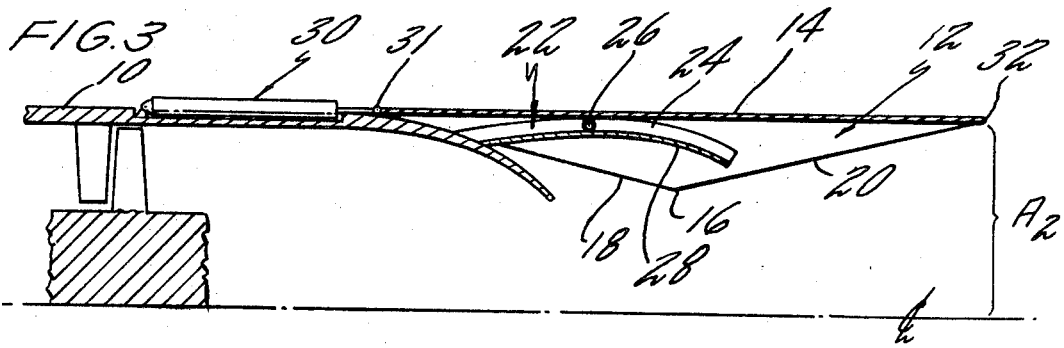
FIG. 3 is a cross-sectional fragmentary showing of the exhaust nozzle construction in a maximum flight speed condition.
Figure 2:
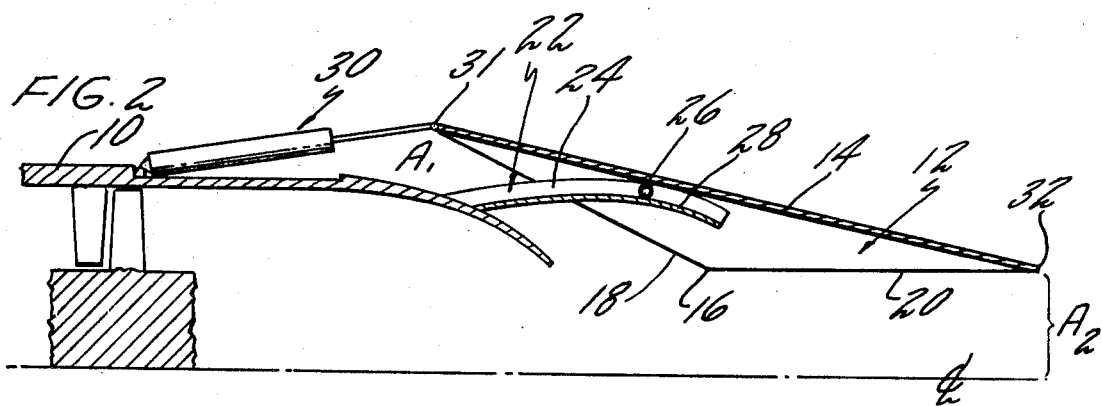
FIG. 2 is a cross-sectional fragmentary showing of the exhaust nozzle construction in an intermediate flight speed position.
Figure 1:
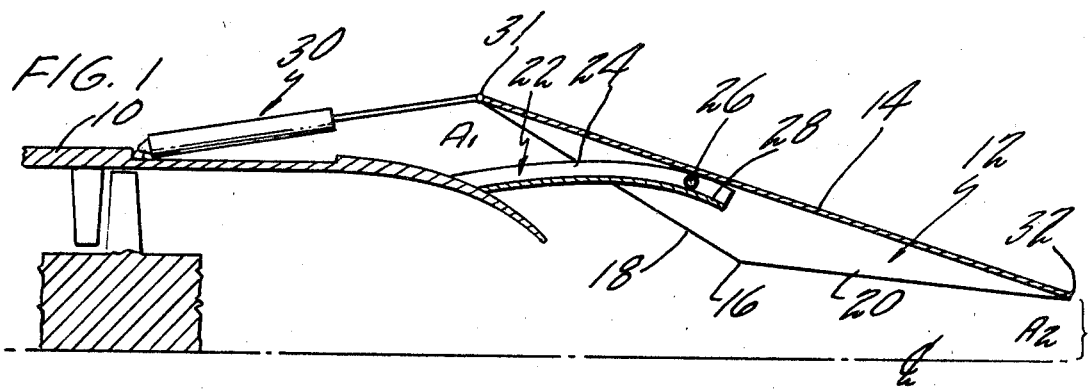
FIG. 1 is a cross-sectional fragmentary showing of the exhaust nozzle construction in the takeoff condition.

The invention is illustrated in FIGS. 1, 2 and 3 in the aft end of a gas turbine powerplant which is primarily adapted for use in an aircraft. A powerplant to which the ejector nozzle system is particularly adapted is disclosed, for example, in the Savin patent, U.S. Pat. No. 2,747,367.

Referring now specifically to FIG. 1, the construction of the present invention is illustrated in the takeoff position. As shown, connected downstream of the engine housing 10 is translatable and rotatable air scoop 12. Air scoop 12 is capable of moving in two planes simultaneously, that is, it may move axially upstream or downstream, and it may move radially inward and outward. Air scoop 12 in this embodiment is illustrated as a pie-shaped member, the outer diameter portion of the pie-shaped member being illustrated at 14. In this embodiment, the outer portion of the pie-shaped member is arranged such that it forms a substantially smooth aerodynamic surface with housing 10 when the air scoop is translated to the closed position, this latter position being illustrated in FIG. 3. At the inner diameter of pie-shaped scoop 12, apex 16 is formed at the junction of leading edge 18 and trailing edge 20 of air scoop 12.

Extending rearwardly from housing 10 is support means 22, herein illustrated as track 24 which extends rearwardly from housing 10 to scoop 12. Positioned on air scoop 12 is at least one roller 26 which operates within track 24, track 24 and roller 26 combining to support the scoop 12 and cause it to move in a predetermined path. This predetermined path is a function of contour 28 of track 24, this predetermined path controlling the position and orientation of the scoop 12 and hence provides the optimum performance condition at each flight condition over the entire flight regime of the engine. The ejector nozzle system includes actuating means 30 herein illustrated as a conventional actuator extending from housing 10 to scoop 12 and causing the actuator to move in the aforementioned described two-plane motion.

As hereinbefore mentioned, FIG. 1 illustrates the air scoop 12 in the position it would take at takeoff conditions. As shown therein, the inlet area A1, or more specifically the area between housing 10 and the leading edge 31 of shroud 12 is at its maximum opened position. Additionally, the exit area A2 which is the area between the engine centerline and the trailing edge 32 of air scoop 12 is at its maximum closed position and in fact may provide a convergent nozzle. as the flight speed is increased, the actuating means causes the air scoop to translate forwardly or upstream and simultaneously causes the air scoop 12 to rotate, the orientation of the scoop 12 being a function of the rotation of the rollers in the track. FIG. 2 illustrates some intermediate position of the air scoop and it can be seen from this figure that the inlet area A1 has been decreased while the exit area A2 has been increased. Finally, FIG. 3 illustrates the position of the air scoop in the maximum flight speed condition, and it can be seen that air scoop 12 is in a substantially abutting relationship with housing 10 and provides a substantially aerodynamically smooth contour therewith. The exit area A2 of the air scoop in this position is at its maximum open position, and in fact may provide a divergent surface. Similarly, the leading edge of scoop 12 would provide a convergent surface thereby providing a convergent-divergent nozzle, this latter configuration being the best configuration for supersonic flow conditions. It should be clear from the description of the foregoing operation and illustrative positions of the air scoop and the configuration assumed thereby that the optimum performance is achieved at each flight condition. More specifically, at takeoff conditions when the overexpansion losses are high, the inlet and exit areas of air scoop 12 are matched to compensate for this and hence lower the overexpansion losses. Similarly at the intermediate flight conditions by matching the inlet and exit areas to affect a tradeoff between overexpansion and inlet drag losses, the optimum performance for this flight condition is achieved.

It is to be borne in mind that the construction of the preferred embodiment is illustrated as an ejector nozzle which is adapted to provide optimum performance. However, the construction of this present invention is equally as advantageous if utilized as a noise suppressor. Additionally, the present invention may be utilized as a thrust spoiler or thrust reverser by simply controlling the exit area A2 of the system. More specifically, the exit area may be closed or limited such that the flow path through the ejector system will be out the inlet area, A1.

We claim:

1. An ejector exhaust nozzle for use in a gas turbine engine for an aircraft including an engine housing wherein the improvement comprises:
    a translatable and rotatable air scoop positioned at the downstream end of the housing;
    means for supporting the air scoop from the housing;
    means for translating and rotating the air scoop, the means including at least one track means supported from the engine housing and cooperating with at least one roller means connected to the air scoop, the orientation of the air scoop controlling the axial and radial positions of the leading and trailing edge of the scoop, and the track means within which the roller means cooperates having a predetermined contour to provide a matched inlet and exit area of the air scoop.

2. An ejector exhaust nozzle as in claim 1 wherein;
    at aircraft takeoff conditions, the contour of the track is such and the location of the roller therewith is such as to cause the air scoop to be axially translated and rotated to a position where the matched inlet area and exit area of the air scoop are at their maximum open and maximum closed positions respectively.

3. An ejector exhaust nozzle as in claim 2 wherein;
    the predetermined contour of the track means is such that as the air scoop is translated axially and rotated by the movement of the roller means in the track means, the matched inlet and exit areas of the air scoop vary from the maximum open inlet area and maximum closed exit area to a substantially closed inlet area and a maximum open exit area at the maximum power condition, each intermediate position of the matched inlet and exit areas providing optimum performance for that particular operating condition.

4. An ejector exhaust nozzle for use in a gas turbine engine for an aircraft including an engine housing wherein the improvement comprises:
    a translatable and rotatable air scoop positioned at the downstream end of the housing, the air scoop being a substantially pie-shaped member, the outer diameter of the pie-shaped member forming a substantially aerodynamically smooth continuation of the housing and the apex of the pie-shaped member is contained on the inner diameter within the exhaust stream, the two sides forming the apex also being the members which determine the inlet and exit areas of the air scoop, means for translating and rotating the air scoop, the means including at least one track means supported from the engine housing and cooperating with at least one roller means connected to the air scoop, the orientation of the air scoop controlling the axial and radial positions of the leading and trailing edge of the scoop and the track means within which the roller cooperates having a predetermined contour to provide a matched inlet and exit area of the air scoop.

5. An ejector exhaust nozzle as in claim 1, wherein;
    at aircraft takeoff conditions, the contour of the track means is such and the location of the roller means therewith is such as to cause the air scoop to be axially translated and rotated to a position where the matched inlet area and exit area of the air scoop are at their maximum open and maximum closed positions respectively.

6. An ejector exhaust nozzle as in claim 2 wherein;
    the predetermined contour of the track means is such that as the air scoop is translated axially and rotated by the movement of the roller means in the track means, the matched inlet and exit areas of the air scoop vary from the maximum open inlet area and maximum closed exit area to a substantially closed inlet area and a maximum open exit area at the maximum power condition, each intermediate position of the matched inlet and exit area providing optimum performance for that particular operating condition.

7. An ejector exhaust nozzle for use in a gas turbine engine, the engine including a housing wherein the improvement comprises:
    a translatable and rotatable air scoop means positioned at the downstream end of the engine housing,
    means for supporting the air scoop means from the engine housing,
    means for translating and rotating the air scoop means between a forward position and a rearward position,
    said air scoop means having leading and trailing edges,
    said air scoop means having its leading edge forming a substantially smooth aerodynamic surface with the engine housing when it is in its forward position and having its leading edge extending outwardly of said engine housing to scoop air when it is in a rearward position,
    the air scoop means leading and trailing edges being movable simultaneously in the upstream and downstream direction and radially inward and outward, this two-plane movement providing a matched air scoop inlet and outlet area, the inlet and outlet areas being variable over the entire engine-operating range to obtain an optimum performance for each individual engine-operating condition.

8. An ejector nozzle as in claim 7 wherein:
    the inlet and exit areas are matched at the rearward position for engine takeoff conditions so that the inlet area of the air scoop means is at its maximum open position and the exit area of the air scoop means is at its minimum open position.

9. An ejector exhaust nozzle as in claim 8 wherein:
    the leading edge of the air scoop means is moved from the rearward, or maximum open, position to an intermediate position and any position therebetween by translating and rotating the leading edge upstream and radially inward and the trailing edge upstream and radially outward; and
    the inlet area being decreased with respect to the inlet area in the opened position area the exit area being increased with respect to the exit area is the opened position.

10. An ejector exhaust nozzle as in claim 9 wherein:
    the leading edge of the air scoop means is translated from the intermediate position to the forward, or maximum flight speed, position and any position therebetween by translating and rotating the leading edge upstream and radially inward and the trailing edge upstream and radially outward, the inlet area being decreased with respect to the inlet area in the intermediate position and the exit area being increased with respect to the exit area in the intermediate position, the leading edge of the air scoop substantially abutting against the engine housing in the forward, or maximum flight speed position.